United States Patent [19]

Vaughan

[11] Patent Number: 4,956,941
[45] Date of Patent: Sep. 18, 1990

[54] FRONT LOADING FLUSH GLASS RUN SYSTEM

[75] Inventor: Robert A. Vaughan, Dearborn, Mich.

[73] Assignee: The Standard Products Company, Cleveland, Ohio

[21] Appl. No.: 488,432

[22] Filed: Feb. 27, 1990

Related U.S. Application Data

[63] Continuation of Ser. No. 296,801, Jan. 12, 1989, abandoned.

[51] Int. Cl.⁵ .............................................. E06B 7/16
[52] U.S. Cl. ...................................... 49/440; 49/490; 49/502; 52/208; 52/400
[58] Field of Search ................. 49/440, 376, 374, 488, 49/490, 491, 492, 502; 52/211, 208, 400, 716; 296/93, 146

[56] References Cited

U.S. PATENT DOCUMENTS

| | | | |
|---|---|---|---|
| 2,698,072 | 12/1954 | Beck | 189/78 |
| 2,770,487 | 11/1956 | Isbell | 296/47 |
| 2,814,525 | 11/1957 | Thomas | 296/93 |
| 3,189,143 | 6/1965 | Adams | 189/78 |
| 3,230,677 | 1/1966 | Brown | 52/208 |
| 3,797,857 | 3/1974 | Reeves | 280/150 |
| 4,405,175 | 9/1983 | Hoffmann | 296/201 |
| 4,483,113 | 11/1984 | Kruschwitz | 52/208 |
| 4,605,260 | 8/1986 | Sakakibara et al. | |
| 4,621,469 | 11/1986 | Kruschwitz | 52/208 |
| 4,800,681 | 1/1989 | Skillen et al. | |

FOREIGN PATENT DOCUMENTS

| | | | |
|---|---|---|---|
| 0241264 | 10/1987 | European Pat. Off. | |
| 3140140 | 4/1983 | Fed. Rep. of Germany | |
| 3726924 | 3/1988 | Fed. Rep. of Germany | |
| 0188222 | 8/1986 | Japan | 49/502 |
| 61188227 | 8/1986 | Japan | |
| 2140065 | 11/1984 | United Kingdom | 49/490 |

Primary Examiner—Kenneth J. Dorner
Assistant Examiner—Gerald A. Anderson
Attorney, Agent, or Firm—Harness, Dickey & Pierce

[57] ABSTRACT

A vehicle door has a front loading glass run channel frame assembly. The glass run frame assembly is adapted to receive a vehicle window and enable movement of the same within a channel. The glass run frame assembly includes a mechanism to enable securing of the frame assembly to a flange of the vehicle door. Also, the frame assembly includes mirror trim which enables mounting of a side view mirror or the like. The frame assembly may be front loaded onto the vehicle door.

11 Claims, 4 Drawing Sheets

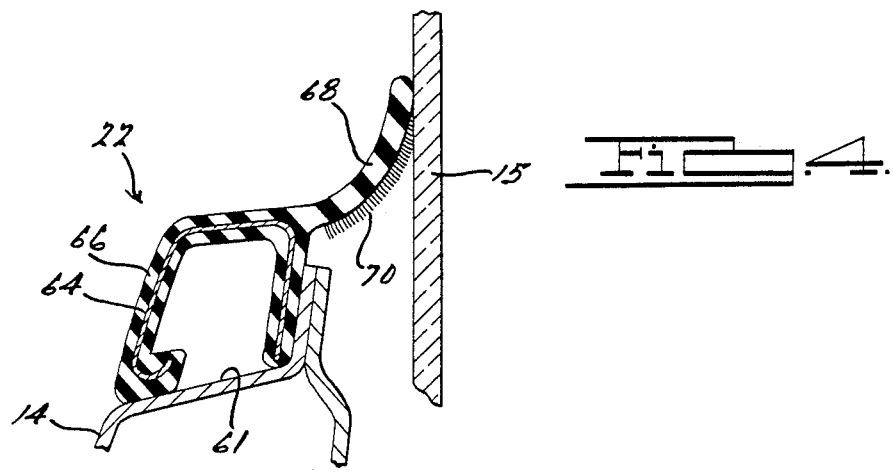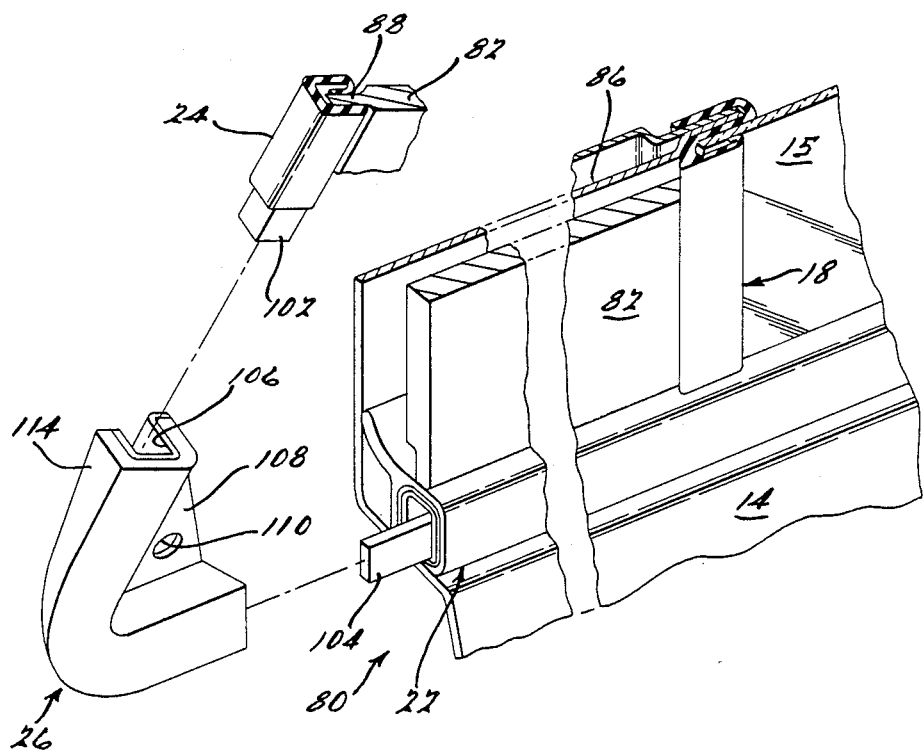

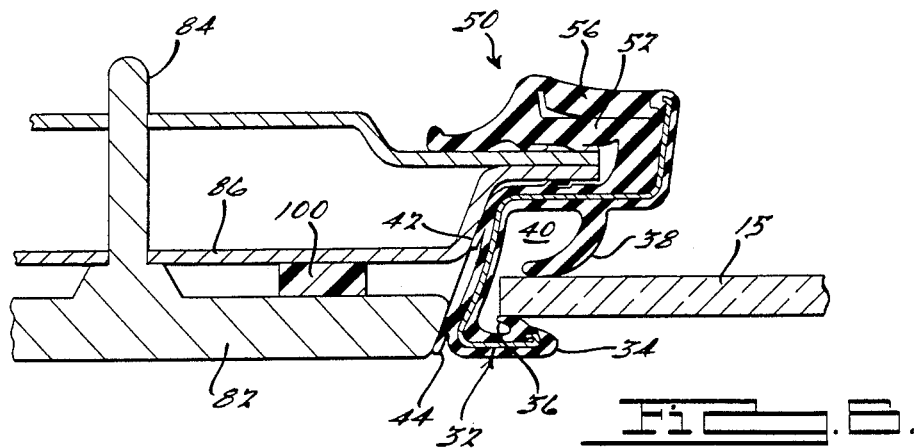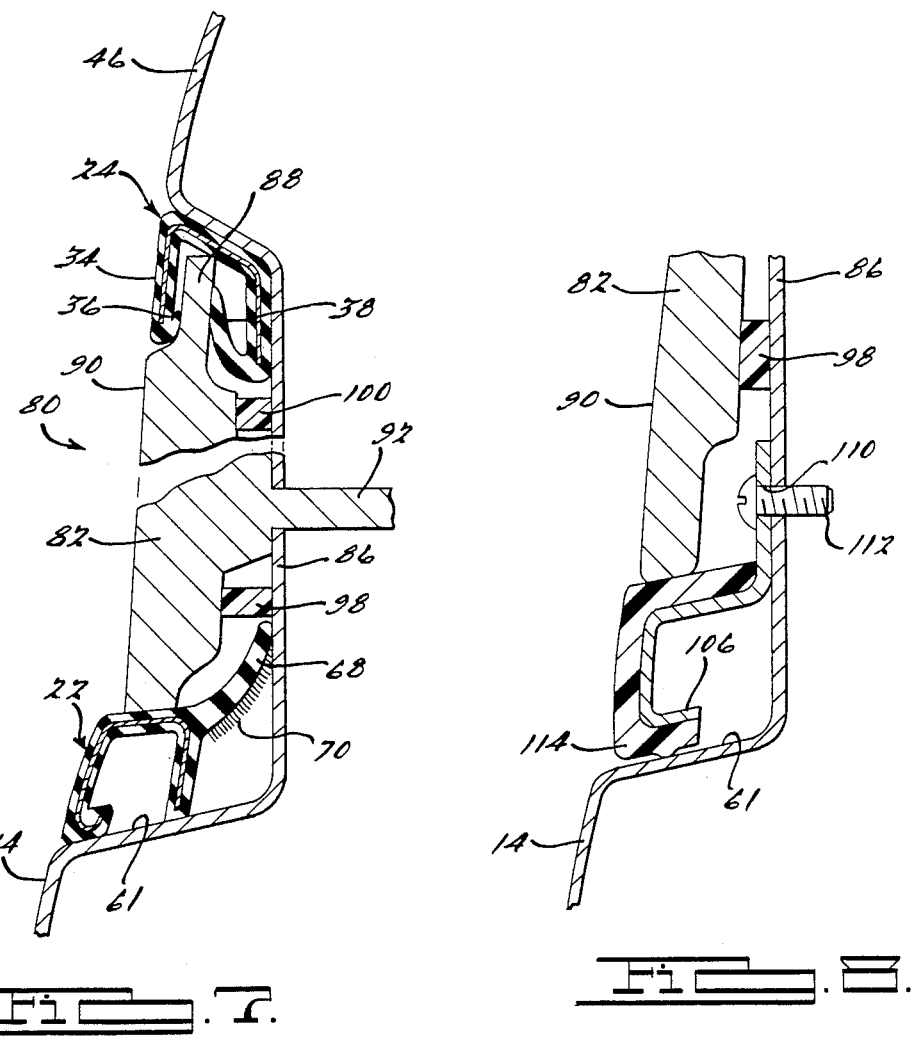

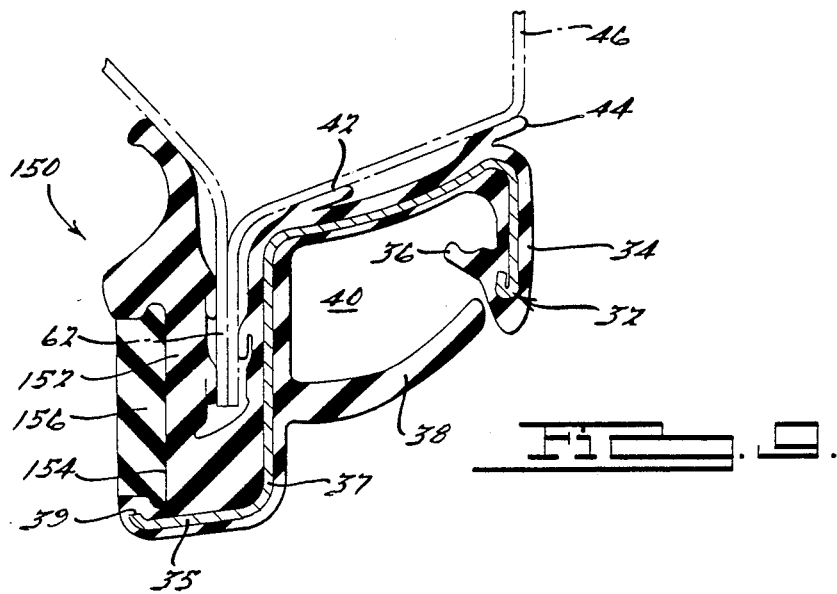
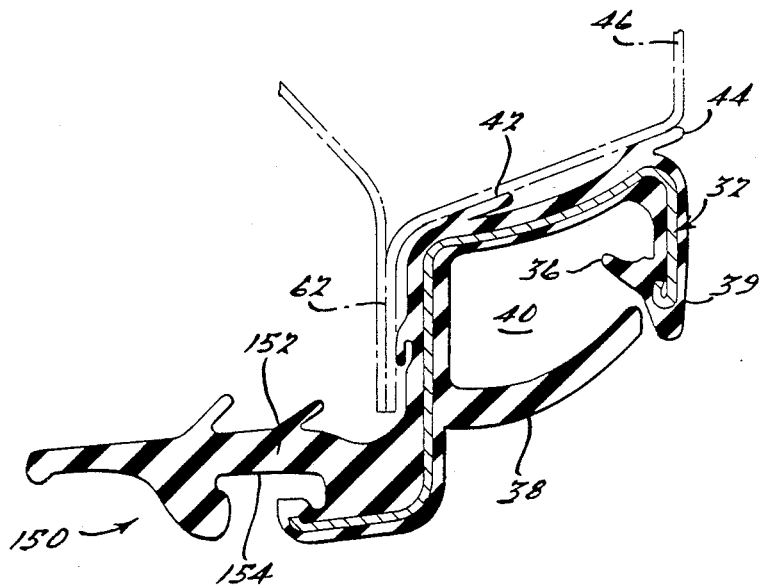

FRONT LOADING FLUSH GLASS RUN SYSTEM

BACKGROUND AND SUMMARY OF THE INVENTION

The present invention relates to automotive vehicles and, more particularly, to glass run frame assemblies.

In the automotive field it is desirable to have a glass run channel frame that easily attaches to the automotive door. Along with the easy attachability, it is desired to have a one-piece construction that may be readily installed into the vehicle door. The glass run channel frame should reduce the time of installation and be less operator dependent during installation. Further, the glass run channel frame should be of a one-piece construction and be able to be front loaded onto a vehicle door.

The present art glass run channel frames are generally of a multi-piece construction which are installed in stages into the vehicle door. This multi-stage construction requires additional installation time and is operator dependent. Further, these systems are not front loaded onto the door and require additional time and expertise during installation.

The present invention provides the art with a one-piece glass run channel frame that may be front loaded onto a vehicle door. The present invention also provides a one-piece glass run channel frame including mirror trim mounting capabilities. The present invention economizes time of installation and is less operator dependent.

From the subsequent detailed description, appended claims and drawings, other objects and advantages of the present invention will become apparent to those skilled in the art.

BRIEF DESCRIPTION OF THE DRAWINGS

FIG. 4 a vertical section view through the plane designated by line 4—4 thereof of FIG. 1.

FIG. 5 is an exploded perspective partially in cross-section view of the area within circle 5.

FIG. 6 is a horizontal cross-section view through the plane designated by line 6—6 thereof of FIG. 1.

FIG. 7 is a vertical cross-section view through the plane designated by line 7—7 thereof of FIG. 1.

FIG. 8 is a cross-section view through the plane designated by line 8—8 thereof of FIG. 1.

FIG. 9 is a vertical cross-section view of another embodiment in accordance with the present invention similar to FIG. 2.

FIG. 10 is a vertical cross-section view of the invention of FIG. 9 similar to FIG. 3.

DETAILED DESCRIPTION OF THE PREFERRED EMBODIMENT

Figure 1:
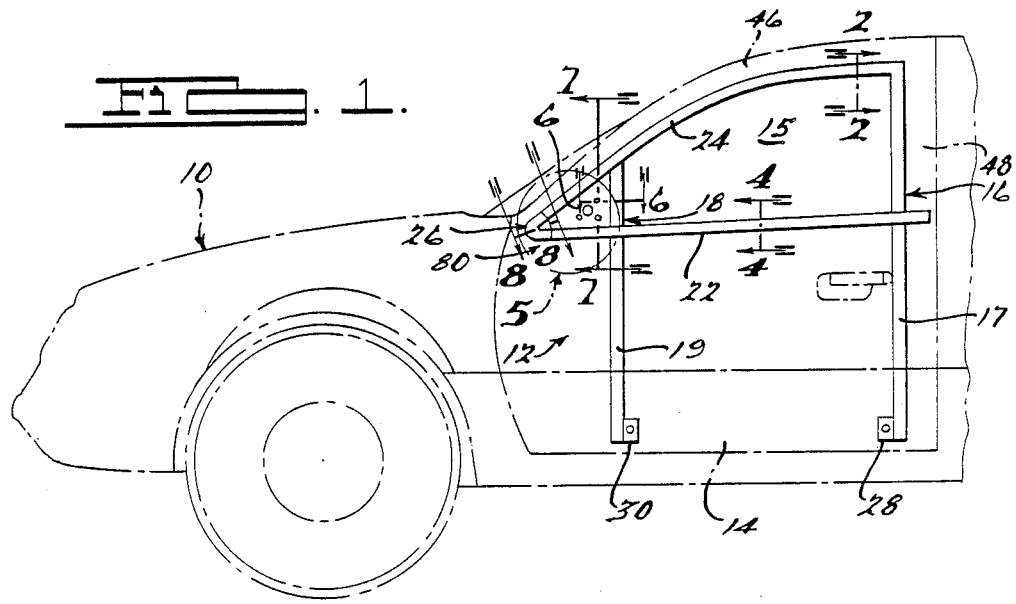
FIG. 1 is a side elevation view of an automotive vehicle including a glass run channel frame in accordance with the present invention.

Turning to the figures, particularly FIG. 1, a vehicle 10 is illustrated with a glass run frame assembly 12. The glass run frame assembly 12 is positioned and secured onto a vehicle door 14. The frame assembly 12 provides up and down movement of the vehicle window 15. The frame assembly 12 is shown on the front door 14, however, the frame assembly 12 may be modified and secured on rear doors as well.

The glass run frame assembly 12 generally includes a first side member 16, a second side member 18, a top member 20 and a bottom member 22. The side members are connected to the bottom and top 20 members by conventional means. The top member 20 has a curved portion 24 extending downward toward the horizontal bottom member 22 and is connected by a corner 26 at the junction of the top member curved portion 24 and bottom member 22.

The side members 16 and 18 extend beyond the bottom member 22 as seen in FIG. 1. The bottom member 22 is substantially transverse to the two side members 16 and 18. Also, the side members 16 and 18 each include support members 28 and 30 to support the frame assembly 12 within the door 14.

Figure 2:
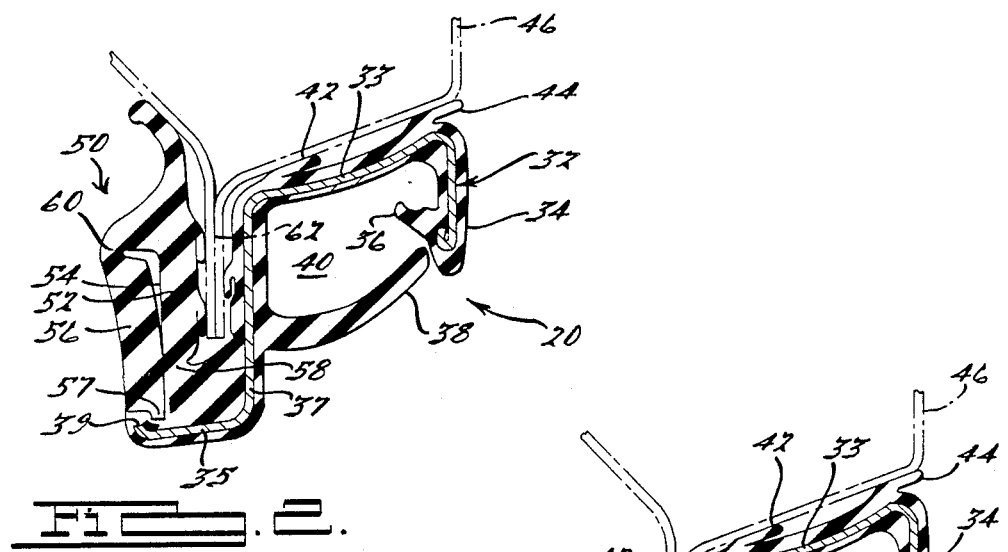
FIG. 2 is a vertical cross-section view through the plane designated by line 2—2 thereof of FIG. 1.

The top 20, bottom 22 and side 16 and 18 members all include a polymeric skin covering and a metallic reinforcement portion. This will be best pointed out in the description of FIGS. 2 through 4 and 6. Turning to FIG. 2, a cross-section view of the top member 20 is shown. The cross-section of top member 20 is substantially the same as the cross-section of both side members 16 and 18. Thus, the below discussion will apply to the side members and the top member.

Figure 3:
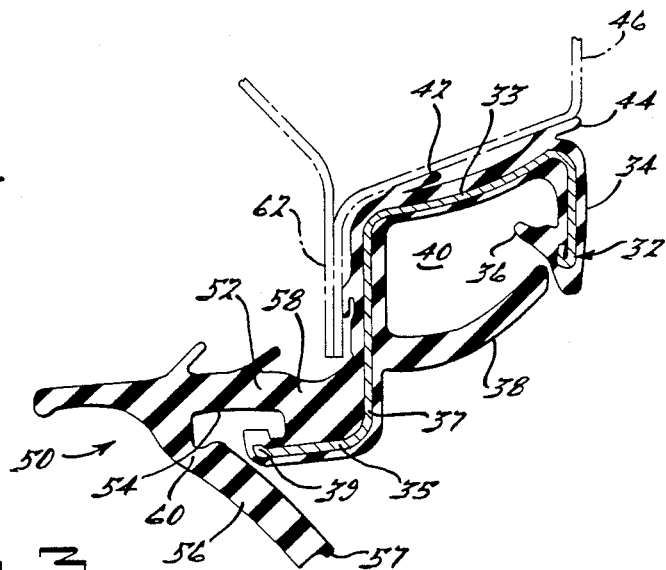
FIG. 3 is a vertical cross-section view similar to FIG. 2 prior to installation.

The top member 20 includes a metallic reinforcement member 32 covered by a polymeric skin 34. The reinforcement member 32, in cross-section, has an overall U-shaped portion 33 with one leg longer than the other. The longer leg includes an extending portion 235 forming an inverted L-shape portion 37 with the U-shaped portion as seen in FIGS. 2 and 3. The free end of the horizontal leg of the L-shaped portion 37 includes an up-turned toe 39. The polymeric skin 34 includes a pair of sealing fingers 36 and 38 to seal the vehicle window 15 within the channel 40 defined by the interior of the U-shaped portion 33 of the reinforcement member 32. The polymeric skin 34 includes a second set of sealing members 42 and 44 which seal the side member 16 against the door header 46. Likewise, the sealing members 42 and 44 of the side member 16 would seal the side member 16 against the door pillar 48.

The polymeric skin 34 also includes a flange retaining portion 50. The retaining portion 50 is generally U-shaped in cross-section, unitary with, extending from the horizontal leg of the L-shaped portion 37 and reversely opposing the U-shaped portion 33 of the reinforcement member 32. The retaining portion 50 includes a flange 52 having a receiving groove 54 and an elongated lock strip 56. The flange 52 and lock strip 56 are integrally formed with the polymeric skin 34 and are connected thereto by narrows 58 and 60. The lock strip 56 includes a toe 57 at its free end. The toe 57 abuts toe 39 when the lock strip 56 is in groove 54 to enhance the sealing force of the flange 52 on the flange 62.

The side members 16 and 18, top member 20 and bottom member 22 are front or outside-in loaded onto the door 14. This is accomplished by positioning the extending portions 17 and 19 of the side members 16 and 18 within the door 14. The support members 28 and 30 are secured to the door 14. The bottom member 22 seats on the door recess 61. The flange 52 and lock strip 56 of the side members 16 and 18 and top member 20 are moved to a position within the periphery of the door flange 62 so that the frame assembly 12 may be positioned directly onto the door 14 from the front or outside of the door. The polymeric flange 52 is moved to a position adjacent to the door flange 62 and the lock strip 56 is inserted into groove 54, as seen in FIG. 2, so that the retaining portion 50 secures to the door flange 62 thus, securing the frame assembly 12 onto the door 14.

FIG. 4 illustrates a cross-section view of the bottom member 22. The bottom member 22 includes a reinforcement member 64 and a polymeric skin 66. The reinforcement member 64 is generally U-shaped in cross-section. The polymeric skin 66 covers the outside and inside of the U-shaped reinforcement member 64. Also the polymeric skin 66 includes an integral sealing member 68 extending from the exterior of the reinforcement member 64 at approximately the junction of the web and leg of the U-shaped reinforcement member 64. The sealing member 68, including flocking 70, seals the vehicle window 15 to prevent rain, precipitation or the like from entering into the door 14.

FIGS. 5 through 8 illustrate the mounting of the mirror trim 80 in the frame assembly 12. The mirror trim 80 includes a mirror plate 82 positioned between the junction of the top member curve portion 24, the bottom member 22 and the backside of the second side member 18. The mirror plate 82 generally includes an aperture 84 in FIG. 1 to enable positioning and attaching of a side view mirror shown in phantom or the like.

Generally, the door 14 has a sheet metal portion 86 directly behind where the mirror plate 82 is to be positioned. The mirror plate 82 includes a beveled portion 88 which secures the mirror plate 82 within the channel of the curve portion 24 of the top member 20. The remaining edges of the mirror plate 82 are substantially continuous with the outer surface 90 of the mirror plate and abut the bottom 22 and side 18 members as shown in FIGS. 6 through 8. The mirror plate 82 also includes projecting members 92 and 94 which pass through apertures in the door sheet metal portion 86 to further secure and position the mirror plate 82 in position on the vehicle door 14.

As seen in FIG. 6, the cross-section of side member 18 is substantially identical to that of top member 20. The sealing members 42 and 44 abut and seal the mirror plate 82 and door sheet metal portion 86. Also the retaining portion 50 is secured to the peripheral door flange 62.

The sealing fingers 36 and 38 of the top member 20 seal the bevel 88 of the mirror plate 82 as seen in FIG. 7. The retaining portion 50 of the top member 20 has been removed in the curve portion defining the mirror trim area. The sealing member 68 abuts the door sheet metal portion 86 to seal the bottom member 22 against the sheet metal portion 86 as seen in FIG. 7. Also foam gaskets 98, 100, or the like may be positioned on the underside of the mirror plate 82 to further enhance the seal.

Connector plugs 102 and 104 are frictionally secured in the end of the curve portion 24 and the end of the bottom member 22 at the junction of the corner 26 as seen in FIG. 5. The plugs 102 and 104 are generally rectangular and insert into the reinforcement channel of the curved portion 24 and bottom 22 members. The plugs 102 and 104 insert into the channel 106 of the corner 26. The corner 26 includes a recessed portion 108 having an aperture 110 which enables a fastener 112, such as a screw, to secure the corner 26 to the sheet metal portion 86 of the door as seen in FIG. 8. The corner 26 includes a polymeric skin 114 covering the channel portion 106. The polymeric skin 114 further enhances the seal between the corner 20 and the door 14.

FIGS. 9 and 10 illustrate another embodiment of the present invention. The elements which are substantially the same as those previously described will be identified with the same reference numbers.

In FIGS. 9 and 10, the cross-section of a side or top member is shown. The reinforcement member 32 is the same as that previously discussed including sealing members 36 and 38 and 42 and 44. The retaining portion 150 varies from that previously described.

The retaining portion 150 is generally U-shaped in cross-section, unitary with, extending from the horizontal leg of the L-shaped portion 37, and reversely opposing the U-shaped portion 33 of the reinforcement member 32. The retaining portion 150 includes a flange 152 and receiving slot 154 and a detached lock strip 156. The lock strip 156 fits into the slot 154 to rigidify the retaining portion 150 once it is applied on a flange 62. The lock strip 156 may be decorative and manufactured from various materials such as rubber, colored PVC and may have a bright mylar coating or the like. the lock strip 156 would be assembled into slot 154 after the retaining portion 150 is positioned about flange 62.

While the above detailed description describes the preferred embodiment of the present invention, it should be understood that the present invention is susceptible to modification, variation and alteration without deviating from the scope and fair meaning of the subjoined claims.

What is claimed is:

1. A glass run assembly comprising:

frame means defining a channel for receiving a vehicle window for enabling up and down movement of the window in said channel said frame means including a polymeric skin surrounding said frame means;

means for securing said frame means to a flange of a vehicle door, said securing means including a deflectable portion enabling said frame means to be front loaded onto said flange, said deflectable portion including means for rigidifying said deflectable portion to secure to said flange, and said securing means unitarily formed with said polymeric skin surrounding said frame means; and means for providing a mounting surface for a side view mirror, said mounting surface means coupled with said frame means.

2. The assembly according to claim 1 further comprising means adapted for supporting said frame means on a vehicle door, said supporting means coupled with said frame means.

3. The assembly according to claim 1 wherein said means for rigidifying includes a receiving groove portion on said flange, and a locking strip portion adapted to be received in said groove for rigidifying said flange for enabling said securing means to secure to the door flange.

4. A window retaining assembly comprising:

a frame defining an outline of a vehicle window, said frame covered with a polymeric skin and having a pair of side member defining a pair of opposing channels, said channels enabling the vehicle window to move in said channels, a top member defining a channel, said top channel continuous with said side channels, said top member and side members for surrounding the vehicle window when the vehicle window is in an up position, a bottom member transverse to said side members for stabilizing movement of the vehicle window in said side channels;

said side members and said top member including means for retaining said members to a door flange, said retaining means including a deflectable portion enabling front loading of said top and side members onto said flange, said deflectable portion including means for rigidifying said deflectable portion to secure to said flange, said retaining means unitarily formed with said polymeric skin of said side and top members; and means for supporting a side view mirror, said supporting means coupled with one of said side members and said top and bottom members.

5. The assembly according to claim 4 wherein said side members and top member being comprised of a reinforcement member in cross-section having a U-shaped portion with an inverted unitary L-shaped portion.

6. The assembly according to claim 5 wherein said means for rigidifying includes a receiving groove portion on said flange, and a locking strip portion adapted to be received in said groove for rigidifying said flange for enabling said retaining means to secure to the door flange.

7. The assembly according to claim 4 wherein said top member including a curved portion extending passed one of said side members and said bottom member extending passed said same side member such that said top and bottom members approach one another and a corner at the junction of said top and bottom members connecting said top and bottom members together.

8. The assembly according to claim 7 wherein said means for supporting a side view mirror or the like is positioned between said junction of said top and bottom members and said one side member.

9. The assembly according to claim 8 wherein said supporting means includes a plate member retained in said channel of said top member.

10. The assembly according to claim 4 wherein said side members include portions extending passed said bottom member.

11. The assembly according to claim 10 wherein said side member portions extending passed said bottom member including means for supporting said assembly on the vehicle door.

* * * * *

UNITED STATES PATENT AND TRADEMARK OFFICE
CERTIFICATE OF CORRECTION

Page 1 of 3

PATENT NO. : 4,956,941
DATED : September 18, 1990
INVENTOR(S) : Robert A. Vaughan It is certified that error appears in the above-identified patent and that said Letters Patent is hereby corrected as shown below:

Column 1, line 45, after "FIG. 4;" insert --is--.

Column 2, line 32, "235" should be --35--.

Column 4, line 22, "the" should be --The--.

Column 4, line 62 (claim 4), "member" should be --members--.

Figs. 1 and 6 of the drawings have been corrected (corrected copies attached).

In Fig. 1, the mirror is shown in phantom and the numeral --84-- added and in Fig. 6, the numeral "84" has been changed to --94--.

Signed and Sealed this

First Day of May, 2001

*Attest:*

NICHOLAS P. GODICI

*Attesting Officer*   Acting Director of the United States Patent and Trademark Office

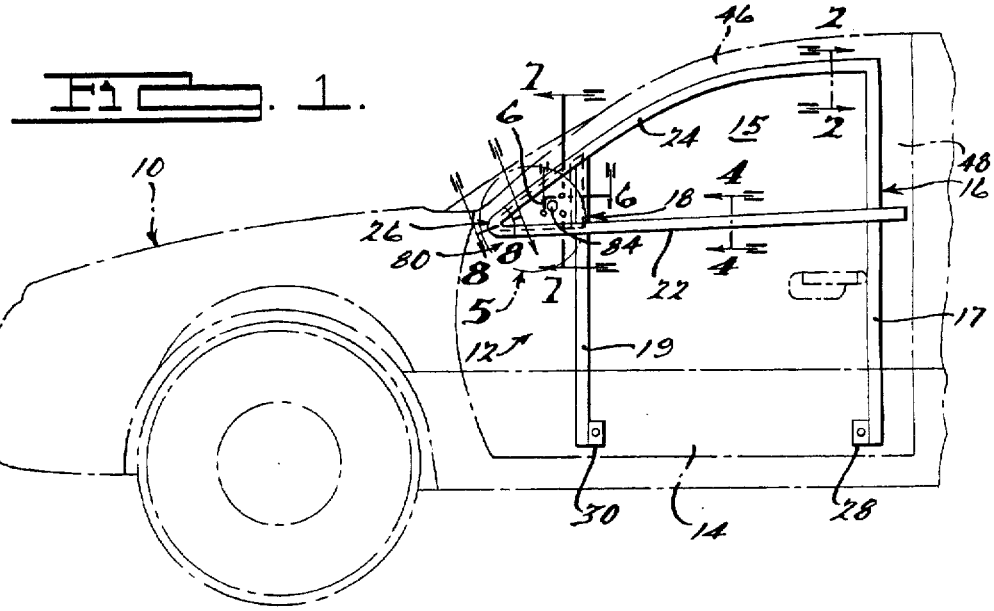

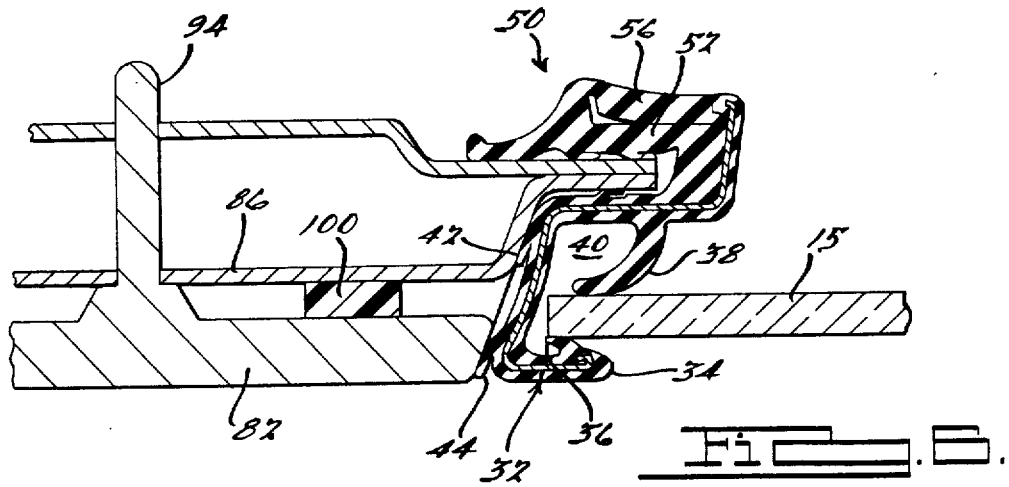
FIG. 6.
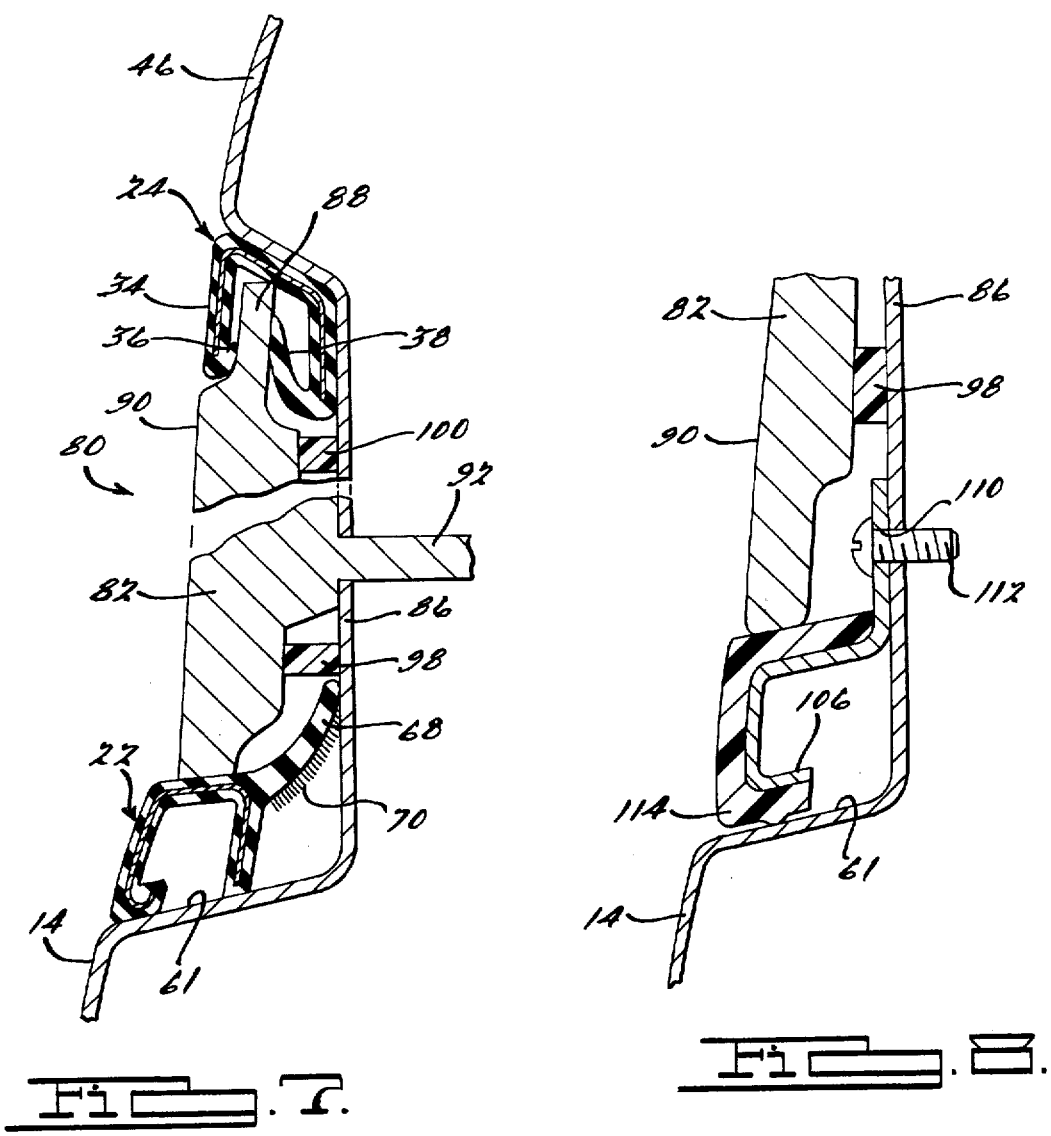
FIG. 7.
FIG. 8.